(12) United States Patent
Scogna et al.

(10) Patent No.: US 8,011,735 B2
(45) Date of Patent: Sep. 6, 2011

(54) WHEEL FOR OMNI-DIRECTIONAL VEHICLE

(76) Inventors: Jules Scogna, Drexel Hill, PA (US); Andrew Adaman, Drexel Hill, PA (US); Michael Crane, Drexel Hill, PA (US)

( * ) Notice: Subject to any disclaimer, the term of this patent is extended or adjusted under 35 U.S.C. 154(b) by 194 days.

(21) Appl. No.: 12/402,730

(22) Filed: Mar. 12, 2009

(65) Prior Publication Data

US 2010/0156168 A1   Jun. 24, 2010

Related U.S. Application Data

(60) Provisional application No. 61/035,773, filed on Mar. 12, 2008.

(51) Int. Cl.
*B60B 19/00*   (2006.01)
(52) U.S. Cl. ..................................... 301/5.23
(58) Field of Classification Search ............... 301/1, 5.1, 301/5.23, 9.2, 40.6, 45, 46, 50, 52, 43, 104; 16/29, 30, 40; 440/12.68, 12.69; 416/145, 416/205
See application file for complete search history.

(56) References Cited

U.S. PATENT DOCUMENTS

| | | | | |
|---|---|---|---|---|
| 1,108,538 A * | 8/1914 | Wood | ............................. | 301/45 |
| 1,433,435 A * | 10/1922 | Van Horn | ...................... | 301/74 |
| 2,182,946 A * | 12/1939 | Landgreen | .................. | 301/44.1 |
| 2,204,650 A * | 6/1940 | Benjamin | ...................... | 301/50 |
| 2,255,004 A * | 9/1941 | Rodanet | ...................... | 416/205 |
| 2,454,130 A * | 11/1948 | Braun | ........................... | 301/5.1 |
| 2,661,068 A * | 12/1953 | Gaskill | ........................ | 416/205 |
| 3,876,255 A * | 4/1975 | Ilon | ............................ | 301/5.23 |
| 5,445,497 A * | 8/1995 | Seemar | ........................ | 416/131 |
| 5,551,349 A * | 9/1996 | Bodzin | ...................... | 104/138.2 |
| 5,701,966 A | 12/1997 | Amico | | |
| 5,984,287 A * | 11/1999 | Fitzsimmons | ................. | 269/17 |
| 6,340,065 B1 | 1/2002 | Harris | | |
| 6,394,203 B1 | 5/2002 | Harris | | |
| 6,409,010 B1 * | 6/2002 | Leon | ........................... | 198/786 |
| 6,547,340 B2 | 4/2003 | Harris | | |
| 7,621,355 B2 * | 11/2009 | Chu et al. | ...................... | 180/7.2 |
| 7,641,288 B1 * | 1/2010 | Baker et al. | ................. | 301/5.23 |
| 2008/0018167 A1 * | 1/2008 | Fuji | ............................ | 301/5.23 |

* cited by examiner

*Primary Examiner* — Russell D Stormer
(74) *Attorney, Agent, or Firm* — Joseph E. Maenner

(57) ABSTRACT

A wheel assembly kit for a Mecanum wheel is provided. The kit includes a convex hub having a central axis and a perimeter. The perimeter comprises a plurality of flat spoke faces extending therearound. A spoke is releasably couplable to each spoke face. The spoke is alignable on the spoke face in a first orientation for one of left-handed and right-handed drive. When the spoke is rotated ninety degrees about its respective spoke face, the spoke is alignable in a second orientation for the other of the left-handed and the right-handed drive. A method of assembling the wheel assembly is also provided.

14 Claims, 7 Drawing Sheets

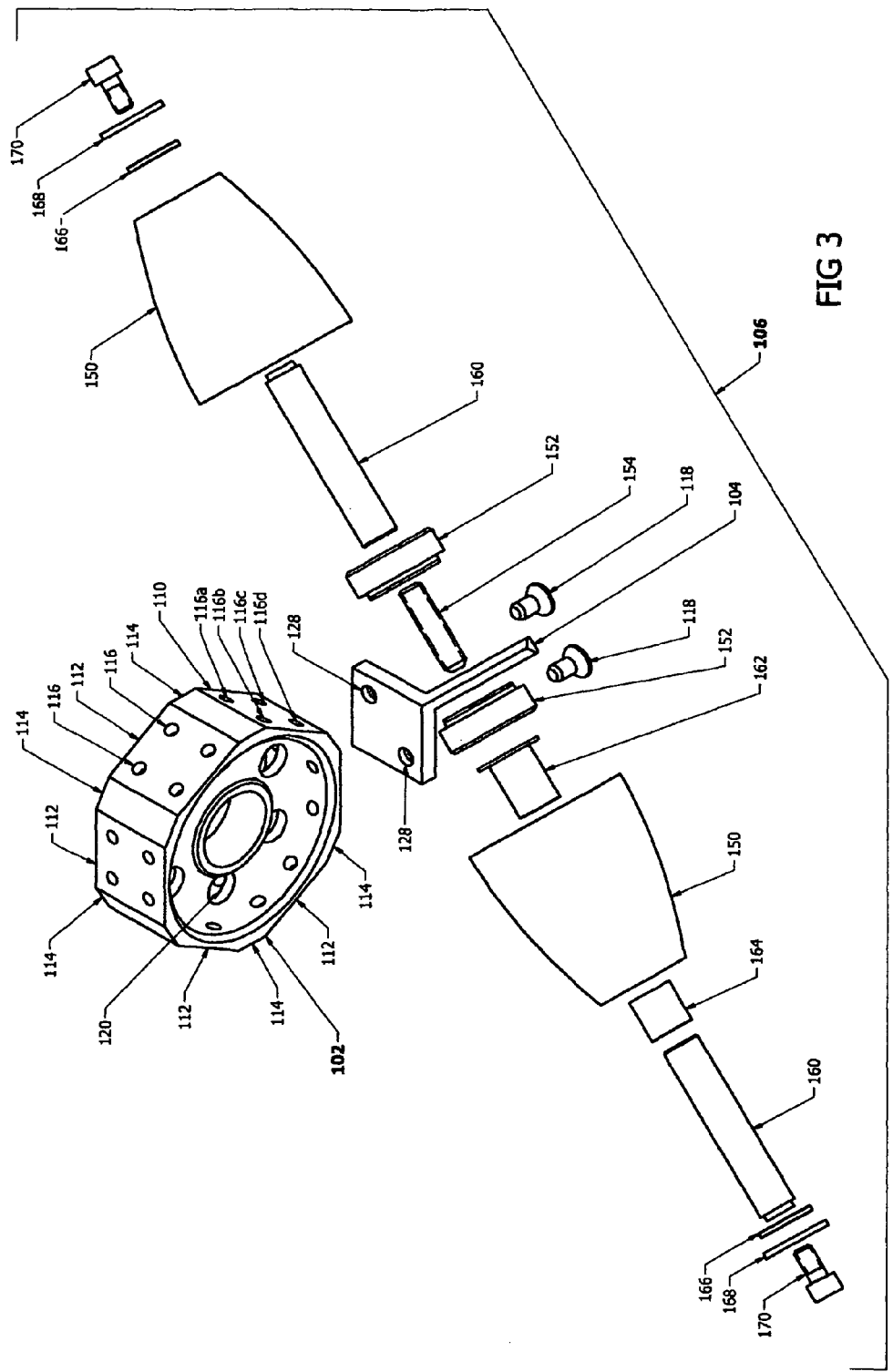

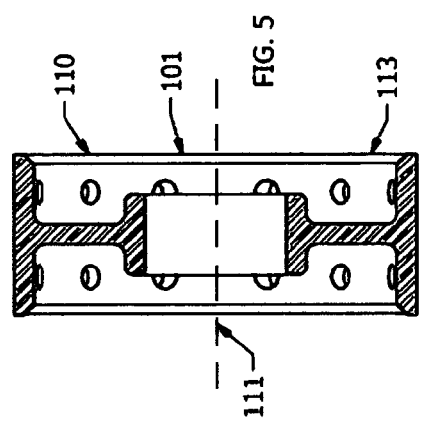
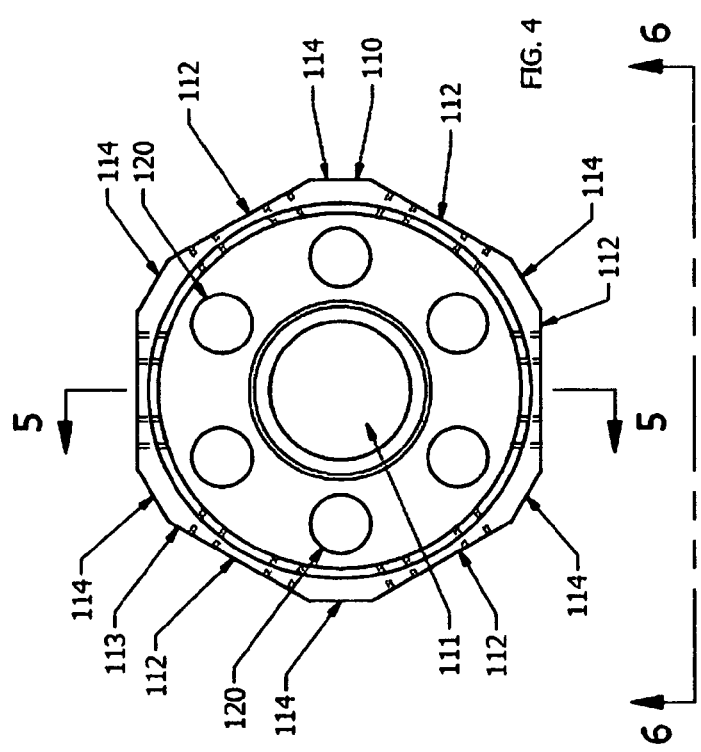
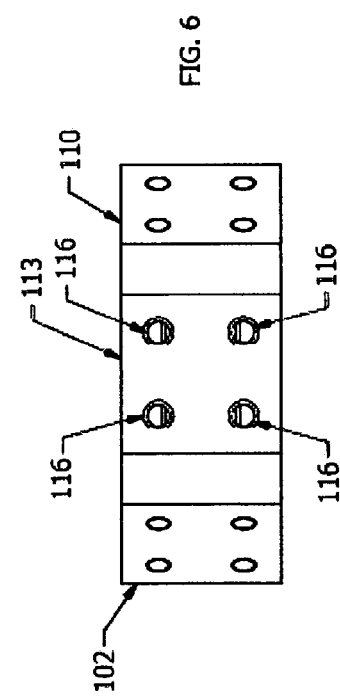

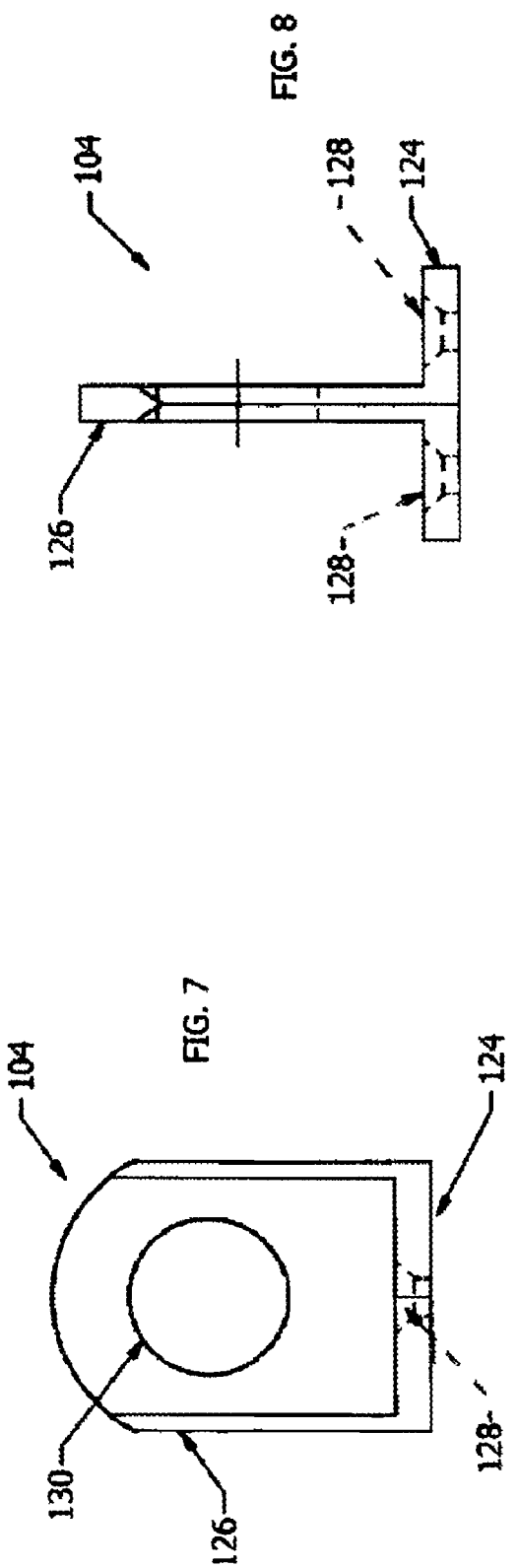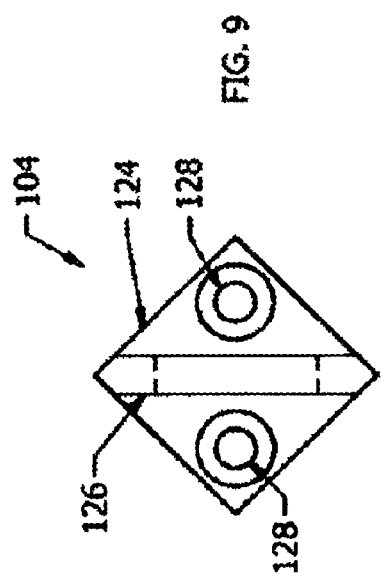

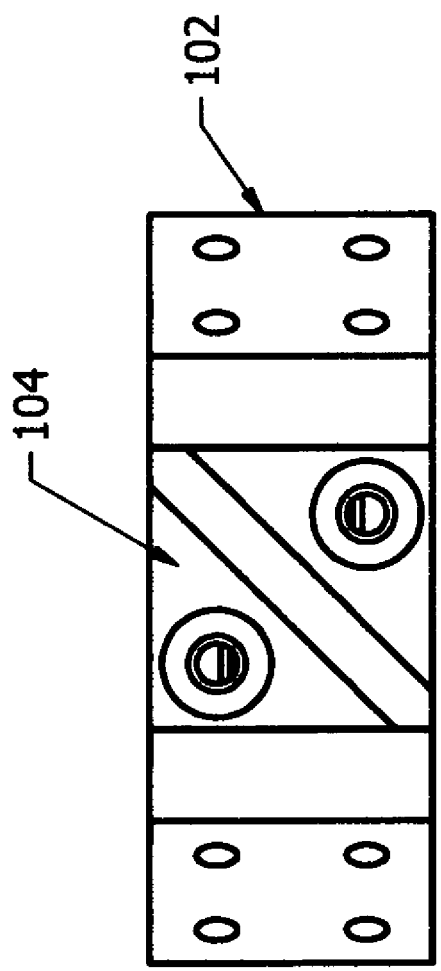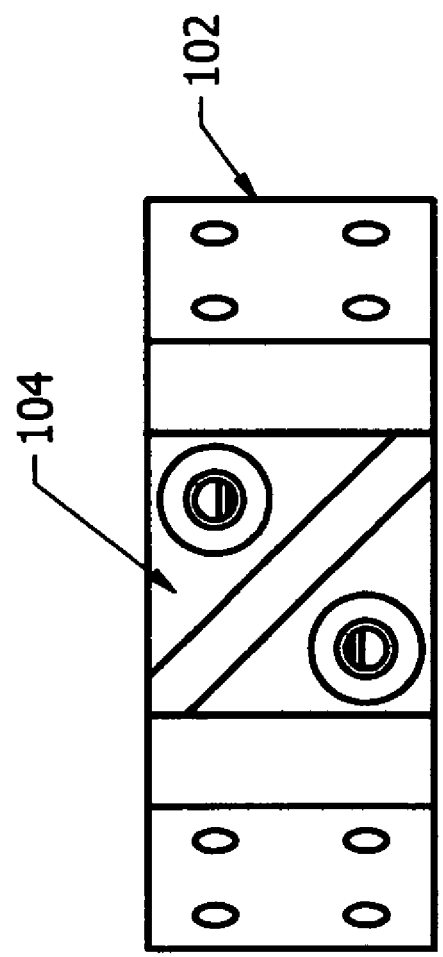

WHEEL FOR OMNI-DIRECTIONAL VEHICLE

CROSS-REFERENCE TO RELATED APPLICATION

The present application claims priority from U.S. Provisional Patent Application Ser. No. 61/035,773, filed on Mar. 12, 2008, which is incorporated by reference in its entirety.

BACKGROUND OF THE INVENTION

A Mecanum wheel assembly is well known for providing a drive mechanism to a vehicle that allows the vehicle to move in all directions, including laterally, by rotating the wheel assemblies of the vehicle in different directions. Each wheel assembly includes a plurality of rollers disposed around the perimeter of a central hub. An exemplary prior art design of a Mecanum wheel is disclosed in U.S. Pat. No. 3,876,255, and incorporated herein by reference.

The hub geometry of a standard Mecanum wheel assembly is relatively complex, with roller axes being formed obliquely to a central hub axis. Further, both left-handed and right-handed hubs are required, at least one for each side of the vehicle. Left-handed hubs are mirror images of right-handed hubs, requiring spares of each of left-handed and right-handed hubs in the event of the failure of one of the hubs. There exists a need to improve the hub geometry of the Mecanum wheel.

SUMMARY OF THE INVENTION

Briefly, the present invention provides a wheel assembly kit comprising a convex hub having a central axis and a perimeter. The perimeter comprises a plurality of flat spoke faces extending therearound. A spoke is releasably couplable to each spoke face. The spoke is alignable on the spoke face in a first orientation for one of left-handed and right-handed drive. When the spoke is rotated ninety degrees about its respective spoke face, the spoke is alignable in a second orientation for the other of the left-handed and the right-handed drive.

Further, a method of assembling a wheel assembly is also provided. The method comprises the steps of providing a hub; determining whether the wheel assembly is a right-handed or a left-handed wheel assembly; and coupling a plurality of spokes to the hub to provide the determined right-handed or left-handed assembly.

Additionally, the present invention also provides a method of changing a directional alignment of a wheel assembly. The method comprises the steps of determining the directional alignment of the wheel assembly, the wheel assembly comprising a hub and a plurality of spokes extending therefrom in an original position; removing the plurality of spokes from the hub; rotating each of the plurality of spokes relative to hub relative to the original position; and reattaching the plurality of spokes to the hub.

BRIEF DESCRIPTION OF THE DRAWINGS

The forgoing summary, as well as the following detailed description of preferred embodiments of the invention, will be better understood when read in conjunction with the appended drawings, which are incorporated herein and constitute part of the specification. For the purposes of illustrating the invention, there are shown in the drawings exemplary embodiments of the present invention. It should be understood, however, that the invention is not limited to the precise arrangements and instrumentalities shown. In the drawings, the same reference numbers are employed for designating the same elements throughout the several figures. In the drawings:

FIG. 3 is an exploded perspective view of a roller assembly used with the wheel assembly of FIG. 1;

FIG. 4 is a side view of a wheel hub of the wheel assembly of FIG. 1;

FIG. 5 is a sectional view of the wheel hub taken along line 5-5 of FIG. 4;

FIG. 6 is a bottom plan view of the wheel hub taken along lines 6-6 of FIG. 4;

FIG. 7 is a front elevational view of a spoke of the wheel assembly of FIG. 1;

FIG. 8 is a side elevational view of the spoke of the wheel assembly of FIG. 1;

FIG. 9 is a top plan view of the spoke of the wheel assembly of FIG. 1;

FIG. 12 is a top plan view of a spoke coupled to the wheel hub in a right-handed configuration; and FIG. 13 is a top plan view of the spoke of FIG. 12 coupled to the wheel hub in a left-handed configuration.

DETAILED DESCRIPTION OF THE INVENTION

Although the invention is illustrated and described herein with reference to a specific embodiment, the invention is not intended to be limited to the details shown. Rather, various modifications may be made in the details within the scope and range of the equivalence of the claims and without departing from the invention. The invention is best understood from the following detail description when read in conjunction with the accompanying drawing figures, which show exemplary embodiments of the invention selected for illustrative purposes. The invention will be illustrated with reference to the figures. Such figures are intended to be illustrative rather than limiting and are included herewith to facilitate the explanation of the present invention.

Figure 1:
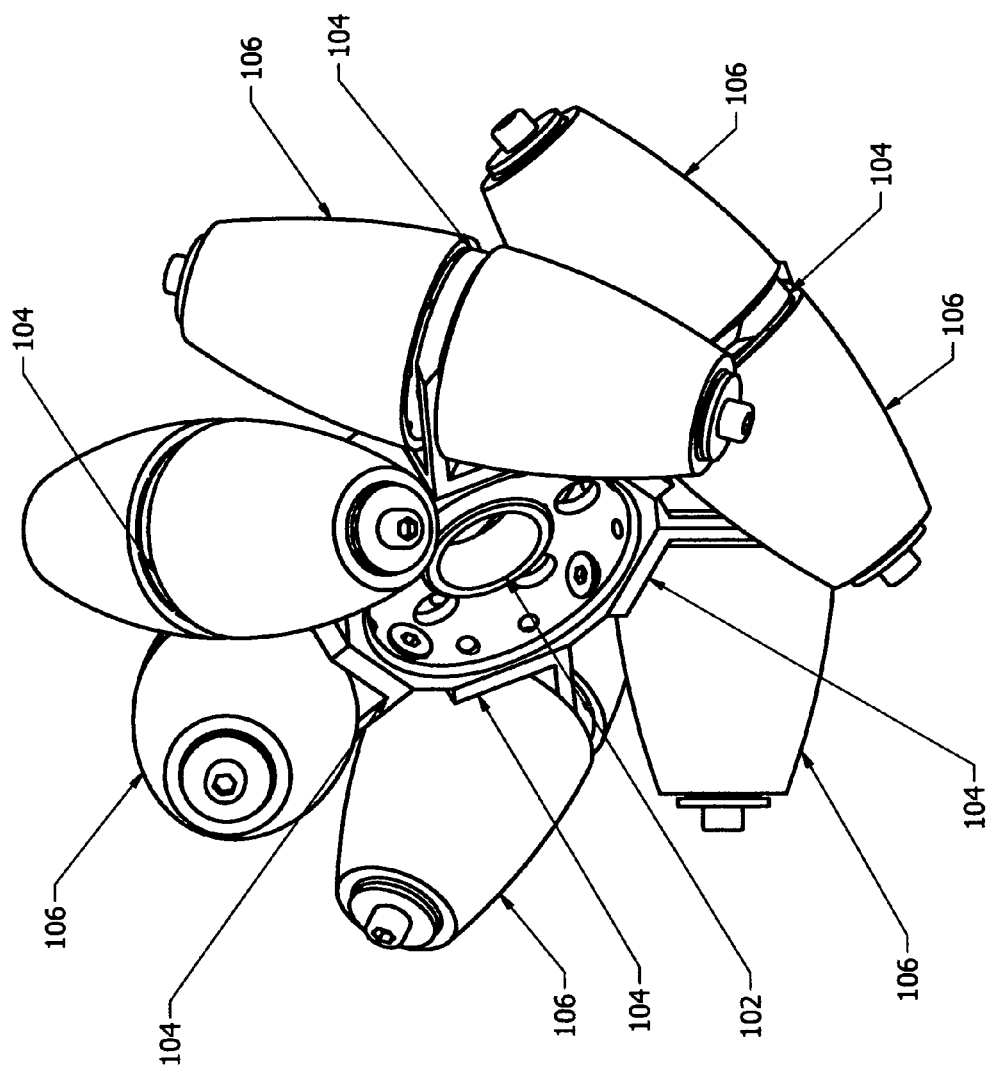
FIG. 1 is a perspective view of a wheel assembly according to an exemplary embodiment of the present invention.
Figure 2:
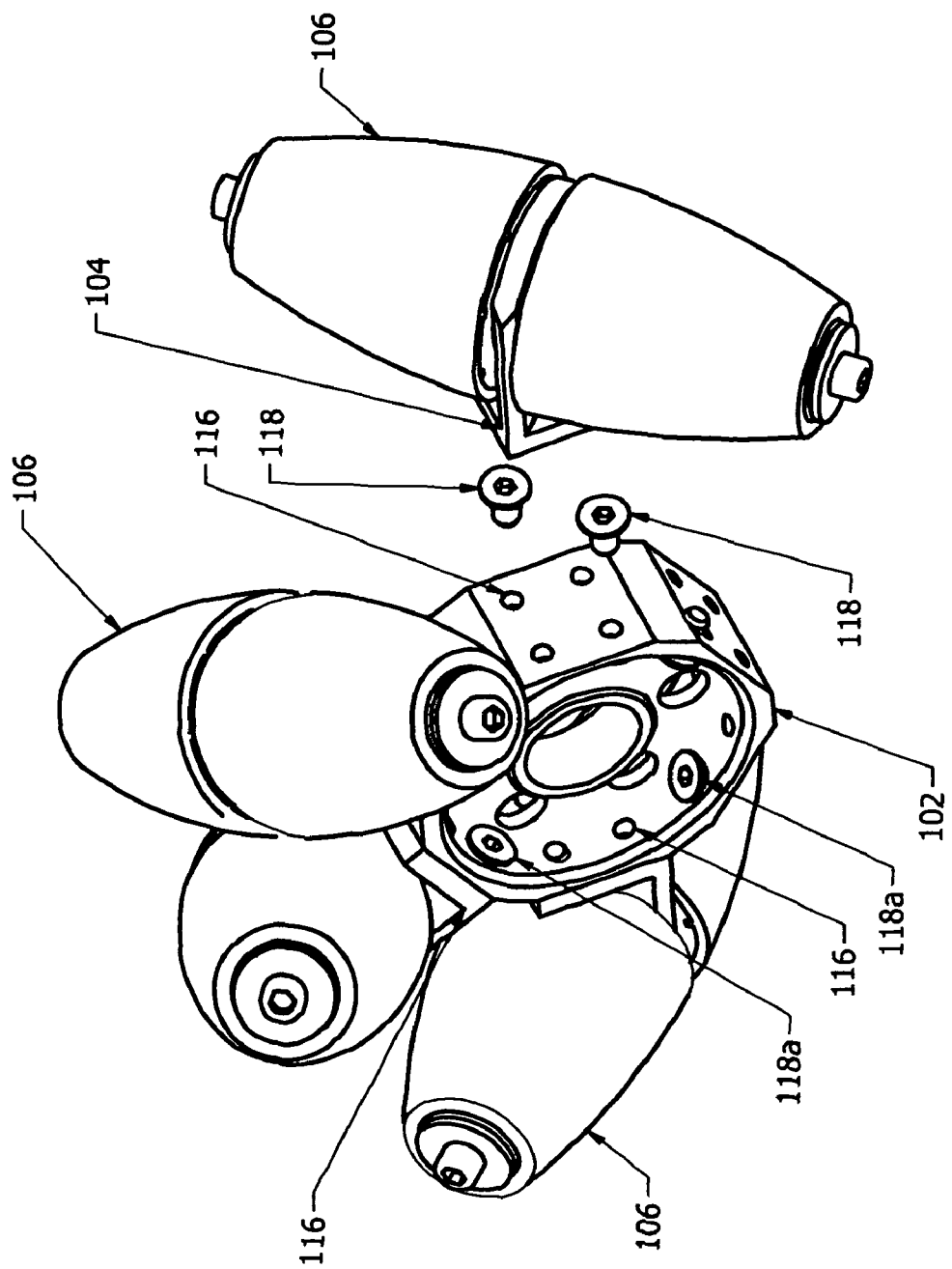
FIG. 2 is a partially exploded perspective view of the wheel assembly of FIG. 1.

Referring to the figures in general, a wheel assembly 100 according to an exemplary embodiment of the present invention is shown. Wheel assembly 100 may be constructed from a kit that includes a hub 102 and a plurality of spokes 104 that may be arranged and releasably coupled to hub 102 in a configuration that results in an assembled wheel to meet the operational requirements of the user. For example, wheel assembly 100 may be assembled to provide either a left-handed or a right-handed wheel for use in an omni-directional vehicle that allows for sideways vehicle movement as well as rotation of the vehicle about a vehicle axis. FIGS. 1 and 2 show a wheel assembly 100 in a right-handed configuration. A roller assembly 106 may be rotatably coupled to each spoke 104.

If, however, the user desires to change the orientation of spokes 104 with respect to hub 102 in order to change wheel assembly 100 from, for example, a right-handed wheel to a left-handed wheel, spokes 104 may be removed from hub 102, rotated to a left-handed orientation, and then reassembled to hub 102. In an exemplary embodiment, this action may be performed without removing roller assembly 106 from its respective spoke 104.

Referring to FIGS. 3-6, hub 102 includes a body 110 having a generally convex outer perimeter and a longitudinal axis 111. A body is "convex" if every line segment drawn between any two points inside the figure lies entirely inside or on the figure. Body 110 includes a plurality of spoke faces 112 that extend around an outer perimeter 113 of body 110. As shown in FIG. 4, six spoke faces 112 are used in the exemplary embodiment. Those skilled in the art, however, will recognize that more or less than six spoke faces 112 may be used. A spacing face 114 separates each spoke face 112 from an adjacent spoke face 112 and provides room for roller assemblies 106 (shown in FIGS. 1 and 2) around hub 102. Each spoke face 112 includes a plurality of threaded openings 116 to accept threaded fasteners 118 (shown in FIGS. 2 and 3) for releasably coupling spoke 104 to spoke face 112.

Hub 102 may be machined from hexagonal bar stock. In an exemplary embodiment, hub 102, as well as spokes 104, may be constructed from aluminum or other light weight material. Cut-outs 120 may be formed in body 110 of hub 102 to reduce weight without adversely compromising the structural integrity of hub 102.

Referring to FIGS. 7-9, each spoke 104 has a generally "T-shaped" cross section, as shown in FIG. 8. Spoke 104 include a base 124 with a flange 126 that extends perpendicularly from base 124. Base 124 is generally square, with flange 126 extending between two opposing corners of the square. A base opening 128 is formed on either side of flange 126 proximate to a remaining corner of base 124. Base openings 128 are sized to allow threaded fasteners 118 to extend therethrough.

While FIG. 3 illustrates threaded fasteners 118 being inserted through threaded openings 128 in spoke 104 and then into threaded openings 116 in spoke face 112 on hub 102, optionally, as illustrated in FIG. 2, threaded fasteners 118a may be first threaded through threaded openings 116 in spoke face 112, and then into threaded openings 128 on spoke 104. This connection arrangement provides the advantage of being able to connect spoke 104 to or disconnect spoke 104 from hub 102 without having to disassemble roller assembly 106, which may be required if threaded fasteners 118 are first inserted through threaded openings 128 in spoke 104 and then into threaded openings 116 in spoke face 112. While, in the exemplary embodiment present described, both openings 116 and 128 are threaded openings, those skilled in the art will recognize that only one of openings 116 and 128 need be threaded, with fastener 118 first extending into the unthreaded hole 116 or 128, and then into the threaded hole 128 or 116.

Spokes 104 are alignable with hub 102 to provide either a left-handed or a right-handed drive. Referring to FIG. 1, wheel assembly 100 is configured for a right-handed drive. In order to obtain the right-handed configuration, spokes 104 are aligned relative to spoke face 112 such that threaded fasteners 118 extend through base openings 128 into threaded openings 116a, 116b as shown in FIG. 3. If wheel assembly 100 is to be configured for a left-handed drive, spoke 104 may be rotated 90 degrees relative to spoke face 112, and threaded fasteners 118 are inserted through base openings 128 in spoke 104 and threaded into threaded openings 116c, 116d.

Figure 10:
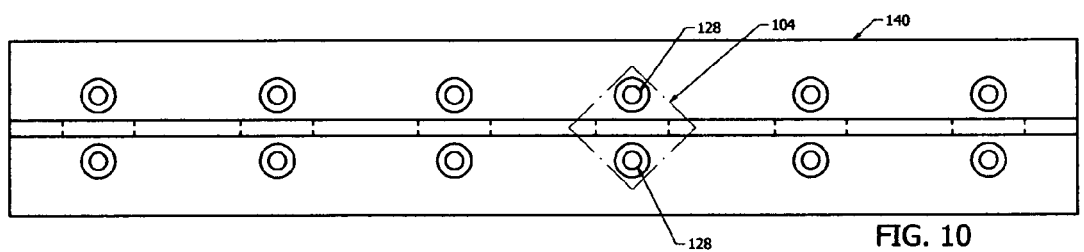
FIG. 10 is a top plan view of a blank used to form the spoke of FIGS. 7-9.
Figure 11:
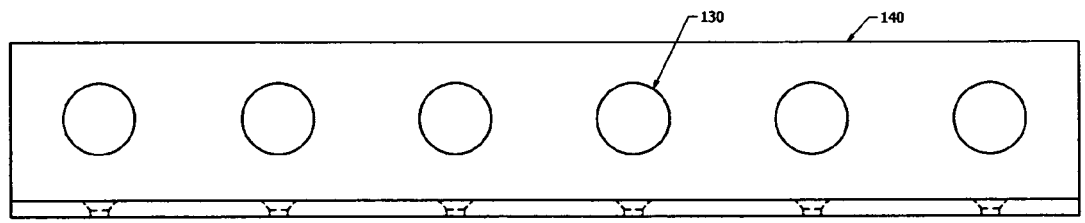
FIG. 11 is a side elevational view of the blank of FIG. 10.

In an exemplary embodiment spokes 104 may be constructed from an elongated piece of T-stock 140, as shown in FIGS. 10 and 11. Base openings 128 and roller axle openings 130 may be formed in T-stock 140. Spoke 104 may then be cut from T-stock 140 along dashed lines as shown in FIG. 10.

Referring to FIG. 3, an exemplary embodiment of roller assembly 106 may be constructed from a pair of curved rollers 150 mounted, on either side of flange 126 at roller axle opening 130. Roller bushings 152 are directly mounted to flange 126 at roller axle opening 130 (shown in FIG. 7). A set screw 154 extends through roller axle opening 130 and roller bushings 152, and is threaded into one end of a roller shaft 160. Rollers 150 are mounted for rotation on each roller shaft 160. A flange bearing 162 and a sleeve bearing 164 support roller 150 on roller shaft 160 (only one each of flange bearing 162 and sleeve bearing 164 are shown in FIG. 3 for clarity). A roller washer 166 and a thrust washer 168 are mounted on a second end of each roller shaft 160. A cap screw 170 retains roller washer 166 and thrust washer 168 on roller shaft 160.

While roller assembly 106 is shown and described herein, those skilled in the art will recognize that other types of roller assemblies may be used with the wheel assembly of the present invention. For example, roller 150 may be constructed with a core (not shown) that includes a polymer base impregnated with a lubricious material, such as, for example, molybdenum disulfide. An advantage to such a construction is that, with such a core, at least flange bearings 162 and sleeve bearings 164 may be eliminated.

An advantage that wheel assembly 100 provides is that wheel assembly 100 may be assembled according to whether the user needs a left-handed or a right-handed drive wheel. Spoke 104 is alignable in a first orientation for one of left-handed and right-handed drive, and when spoke 104 is rotated ninety degrees about its respective spoke face, spoke 104 is alignable in a second orientation for the other of the left-handed and the right-handed drive. For example, FIG. 12 shows spoke 104 coupled to hub 102 in a right-handed configuration, while FIG. 13 shows the same spoke 104 coupled to hub 102 in a left-handed configuration.

Wheel assembly 100 reduces the need to carry spare left-handed and right-handed hubs, which can reduce maintenance costs for wheel assembly 100. Additionally, in the event that a spoke 104 bends or breaks from hub 102, the entire wheel assembly 100 does not need to be replaced; only the bent or broken spoke 104 needs to be removed from hub 102 and replaced with a replacement spoke 104.

Further, the modularity of wheel assembly 100 eliminates the need for complex machining to machine a hub with integrated spokes. Wheel assembly 100 may be machined relatively easily from hexagonal bar stock and T-stock. This manufacturing process greatly reduces the cost of manufacturing each wheel assembly 100.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A wheel assembly kit comprising:
    a hub having a central axis and a perimeter, wherein the perimeter comprises a plurality of flat spoke faces extending therearound, each spoke face having a first set of opposing corners and a second set of opposing corners; and
    a spoke releasably couplable to each spoke face, such that each spoke has a spoke base releasably connectable to the hub and a spoke flange extending perpendicularly from the base, the spoke flange having an opening extending therethrough;
wherein each spoke is alignable on the spoke face in a first orientation such that the spoke flange extends toward the first set of opposing corners on the spoke face and wherein, when each spoke is rotated ninety degrees about its respective spoke face, the spoke is alignable in a second orientation such that the spoke flange extends toward the second set of opposing corners on the spoke face.

2. The wheel assembly kit according to claim 1, further comprising a roller rotatable coupled to each spoke flange.

3. The wheel assembly kit according to claim 2, wherein the base comprises a generally square configuration and wherein the flange extends between opposing corners of the square.

4. The wheel assembly kit according to claim 3, wherein the base further comprises an opening extending therethrough on either side of the flange.

5. The wheel assembly kit according to claim 1, wherein the plurality of flat spoke faces comprises six flat spoke faces.

6. The wheel assembly kit according to claim 1, further comprising a plurality of fasteners adapted to couple the spoke to the spoke face, wherein the spoke and the hub each include openings through which the fasteners are adapted to be inserted, such that the fasteners are adapted to extend through the hub and then into the opening in the spoke.

7. The wheel assembly kit according to claim 1, further comprising a plurality of fasteners adapted to couple the spoke to the spoke face, wherein the spoke and the hub each include openings through which the fasteners are adapted to be inserted, such that the fasteners are adapted to extend through the spoke and then into the opening in the hub.

8. A method of assembling a wheel assembly comprising the steps of:
   providing a hub having a plurality of flat spoke faces extending around a perimeter thereof, each of the plurality of spoke faces having a first set of opposing corners and a second set of opposing corners; and
   providing a like plurality of spokes, each spoke having:
      a generally square base; and
      a flange extending outward from the base and toward opposing base corners;
   determining an orientation of each of a plurality of spokes on a respective spoke face such that each respective flange extends toward one of the first set of opposing corners and the second set of opposing corners; and
   releasably coupling a spoke to spoke to each of the plurality of flat spoke faces to the hub such that all of the spokes are aligned in a common orientation.

9. The method according to claim 8, wherein the coupling step comprises using a fastener to releasably couple each of the plurality of spokes to the hub.

10. The method according to claim 9, wherein the coupling step further comprises inserting the fastener through an opening in the hub and then into the spoke.

11. The method according to claim 9, wherein the coupling step further comprises inserting the fastener through an opening in the spoke and then into the hub.

12. A method of changing a directional alignment of a wheel assembly comprising the steps of:
   (a) determining the directional alignment of the wheel assembly, the wheel assembly comprising a hub having a plurality of spoke faces, each spoke face having a first set of opposing corners and a second set of opposing corners and a like plurality of spokes, each spoke having a spoke flange extending from one of the plurality of spoke faces along a respective spoke axis through the center of the hub in an original position such that each of the spoke flanges extends between the first set of opposing corners;
   (b) removing the plurality of spokes from the hub;
   (c) rotating each of the plurality of spokes about the respective spoke axis relative to the original position such that each of the spoke flanges extends between the second set of opposing corners; and
   (d) reattaching the plurality of spokes to the hub.

13. The method according to claim 12, wherein step (c) comprises the step of rotating each of the plurality of spokes 90 degrees.

14. The method according to claim 12, wherein step (d) comprises the step of releasably reattaching the plurality of spokes to the hub.

* * * * *